US006883266B1

(12) United States Patent
Valdivia Sr.

(10) Patent No.: US 6,883,266 B1
(45) Date of Patent: Apr. 26, 2005

(54) FISH HOOK PROTECTOR

(76) Inventor: Alejandro Valdivia Sr., 6536 SW. 23 St., Miami, FL (US) 33155

( * ) Notice: Subject to any disclaimer, the term of this patent is extended or adjusted under 35 U.S.C. 154(b) by 0 days.

(21) Appl. No.: 10/768,208

(22) Filed: Feb. 2, 2004

(51) Int. Cl.[7] .............................................. A01K 97/06
(52) U.S. Cl. ........................................ 43/25.2; 43/57.1
(58) Field of Search ................................. 43/25.2, 57.1

(56) References Cited

U.S. PATENT DOCUMENTS

| | | | | |
|---|---|---|---|---|
| 2,556,403 A | * | 6/1951 | Sokolik ...................... | 43/25.2 |
| 2,993,293 A | * | 7/1961 | Blout ........................ | 43/57.1 |
| D219,973 S | * | 2/1971 | Sather ....................... | 43/57.1 |
| 4,015,361 A | * | 4/1977 | O'Reilly et al. ............. | 43/25.2 |
| 4,067,134 A | * | 1/1978 | Billings ..................... | 43/25.2 |
| 4,452,003 A | * | 6/1984 | Deutsch et al. .............. | 43/25.2 |
| 4,667,433 A | | 5/1987 | Thompson, Jr. ............. | 43/25.2 |
| 4,757,637 A | * | 7/1988 | Christensen ................ | 43/57.1 |
| 4,884,357 A | * | 12/1989 | Clifford ...................... | 43/25.2 |
| 4,936,040 A | * | 6/1990 | Reiter et al. ................ | 43/25.2 |
| 5,430,969 A | * | 7/1995 | Taylor et al. ............... | 43/25.2 |
| 5,475,942 A | * | 12/1995 | Tatum ....................... | 43/25.2 |
| 5,535,541 A | * | 7/1996 | Fisher ....................... | 43/57.1 |
| 6,014,831 A | * | 1/2000 | Curry ........................ | 43/25.2 |
| 6,168,017 B1 | | 1/2001 | Bohmer et al. ........ | 206/315.11 |
| 6,301,825 B1 | * | 10/2001 | Doreian ..................... | 43/57.1 |
| 6,367,190 B1 | * | 4/2002 | Looney et al. .............. | 43/57.1 |
| 6,474,013 B1 | * | 11/2002 | Terry ......................... | 43/57.1 |
| 6,574,906 B1 | * | 6/2003 | Meier et al. ................ | 43/25.2 |
| 6,691,448 B1 | * | 2/2004 | Jones ........................ | 43/25.2 |
| 2003/0217501 A1 | * | 11/2003 | Jang .......................... | 43/25.2 |

FOREIGN PATENT DOCUMENTS

| | | | |
|---|---|---|---|
| JP | 2001-112393 B1 | * | 4/2001 |
| WO | WO-89/11791 A1 | * | 12/1989 |

* cited by examiner

*Primary Examiner*—Darren W. Ark
(74) *Attorney, Agent, or Firm*—Albert Bordas; Jesus Sanchelima

(57) ABSTRACT

A fish hook protector comprising a body member having a hooked tail. The fish hook protector is removably secured onto a graduated guide of a fishing rod in the preferred embodiment when the fishing hook is not in use; to protect a user from being hooked, stabbed, or otherwise injured by a fishing hook while secured to a fishing line on a fishing pole.

4 Claims, 4 Drawing Sheets

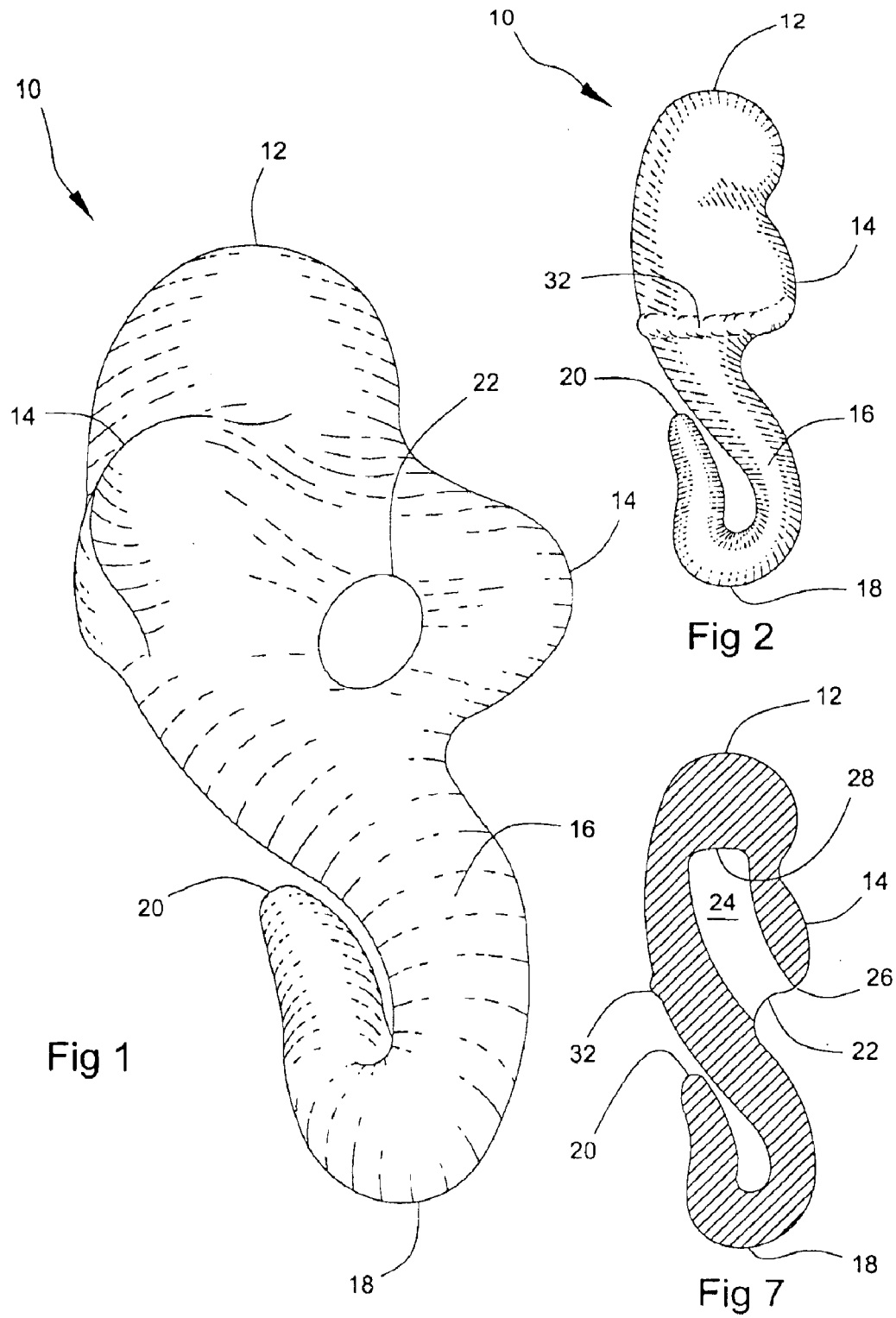

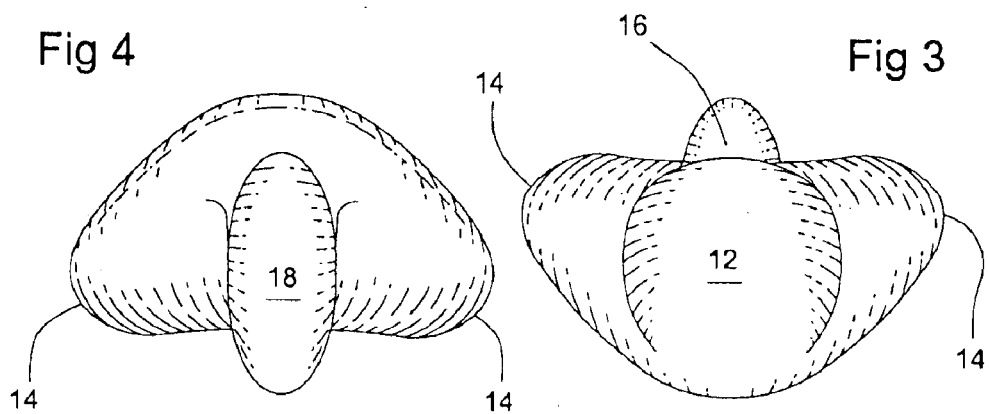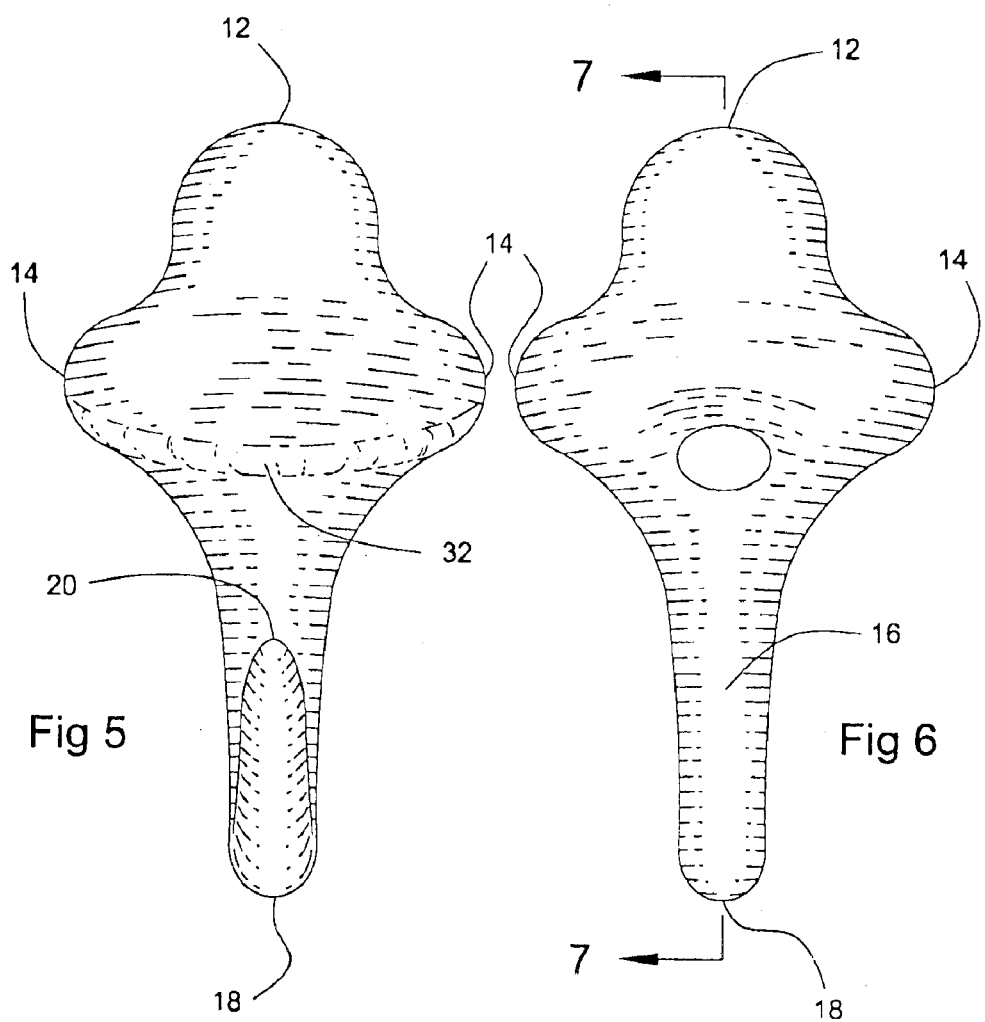

FISH HOOK PROTECTOR

BACKGROUND OF THE INVENTION

1. Field of the Invention

The present invention relates to fishing equipment, and more particularly, to fish hook safety devices.

2. Description of the Related Art

Fishing hooks are dangerous and it is not uncommon for individuals to be hooked, stabbed, or otherwise injured by a fishing hook while secured to a fishing line on a fishing pole. A point and a barb are typically found on the intrusive portion of known hooks.

It is known in the art to position the intrusive portion of an unprotected fishing hook in a graduated guide to secure fishing line and a fishing hook to a fishing rod for storage. However, existing guards and storage devices are bulky and prevent the hook from being secured to the graduated guides in a conventional manner.

Several designs for fish hook protectors have been designed in the past. None of them, however, includes a body assembly having cooperative protuberances that allow for leverage to be forced upon to safely store a fishing hook when a fishing hook is secured on line of a fishing pole.

Applicant believes that the closest reference corresponds to U.S. Pat. No. 4,667,433 issued to Thompson, Jr. for Fish hook safety device. However, it differs from the present invention because Thompson, Jr. teaches a fish hook safety device to safely and securely hold a hook whether single or gang while the hook is attached to a fishing line or stored in a tackle box for later attachment and use. The device has a sloping interior surface defined by the frustum of a right cone. The barbed and pointed ends of a hook rest on the sloping surface. The device accommodates a variety of hooks of different sizes and shapes.

Applicant believes that another close reference corresponds to U.S. Pat. No. 5,535,541 issued to Fisher for Fishing hook guard. However, it differs from the present invention because Fisher teaches a fishing hook guard including an elongated tubular base having a closed bottom end and an open top end and an inside diameter for receiving the point and barb of the hook and a cap adapted to fasten to and cover the open top end of the base so as to lock the point and barb of the hook in the guard. The cap and base are fastened together to hold the intrusive end of the hook thereinside. One or more longitudinal slots can be provided in the open top end of the base to receive the shaft of the hook. A generally lateral and outwardly protruding flange is interposed between the ends of the base to protect the user's thumb and/or fingers from being inadvertently poked during an attempted insertion of the hook into the base. Structures for aiding the user in gripping the outside of the guard are provided thereon.

Applicant believes that another close reference corresponds to U.S. Pat. No. 6,168,017 issued to Bohmer, et al. for Device for storing and dispensing fishhooks. However, it differs from the present invention because Bohmer, et al. teaches a device for storing and dispensing small articles such as fishhooks. The dispenser is formed of two oppositely disposed side portions or with a spaced opening therebetween. Each side portion has a flexible cushioned flat surface adjacent the spaced opening. The side portions are positioned against tie flexible cushioned flat surfaces to create a means for entrapping objects between the closed surfaces of the side portions when a force is used to hold one side portion against the other. The articles may be trapped completely inside the perimeter of the closed surfaces or partially trapped, allowing portions of the articles to extend just beyond the perimeter. The force holding the two side portions together is sufficient to hold the objects securely between the side portions also enabling articles extending beyond the periphery of the side portions to be removed individually with moderate force. The disclosure also relates to a dispenser having a peripheral groove or a plurality of peripheral slits to store and dispense small articles.

Other patents describing the closest subject matter provide for a number of more or less complicated features that fail to solve the problem in an efficient and economical way. None of these patents suggest the novel features of the present invention.

SUMMARY OF THE INVENTION

The present invention facilitates rather than interferes with the attachment of fishing line with a fishing hook thereon to graduated guides of a fishing rod for storage.

The instant invention is a fishing hook guard for covering a fishing hook having a shaft terminating in a point and a barb extending rearwardly and outwardly from the point. It comprises a body member having a head, shank, and a tail. The body member also has at least one protuberance at a first predetermined distance from the head extending towards the tail. The body member further comprises an aperture for receiving the point and the barb of the fishing hook thereinside. The aperture extends internally towards the head. The tail has a hook form and terminates at a tip. The tail is removably mounted onto a graduated guide of a fishing rod.

Gripping means are provided on the at least one protuberance. The gripping means include a generally horizontally and outwardly protruding ridge interposed between the first and second ends so as to grip the fishing hook guard during insertion of the point and the barb into the aperture.

Protecting means are also provided on the at least one protuberance. The protecting means include the generally horizontally and outwardly protruding ridge interposed between the first and second ends so as to protect a user from being inadvertently injured by the fishing hook during insertion of the point and the barb into the aperture.

The tail is sufficiently hooked so that the tip contacts or nearly contacts the shank so as to secure the fishing hook guard onto the graduated guide and the fishing hook guard can be made of a durable plastic material and of a fluorescent material.

It is therefore one of the main objects of the present invention to provide a fish hook protector that protects a user from being hooked, stabbed, or otherwise injured by a fishing hook while secured to a fishing line on a fishing pole.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a perspective view of the instant invention.

FIG. 2 shows a side view of the instant invention.

FIG. 3 shows a top view of the instant invention.

FIG. 4 shows a bottom view of the instant invention.

FIG. 5 shows a front view of the instant invention.

FIG. 6 shows a rear view of the instant invention.

FIG. 7 illustrates a cut view taken along the line 7—7 as seen in FIG. 6.

DETAILED DESCRIPTION OF THE PREFERRED EMBODIMENT

Figure 8:
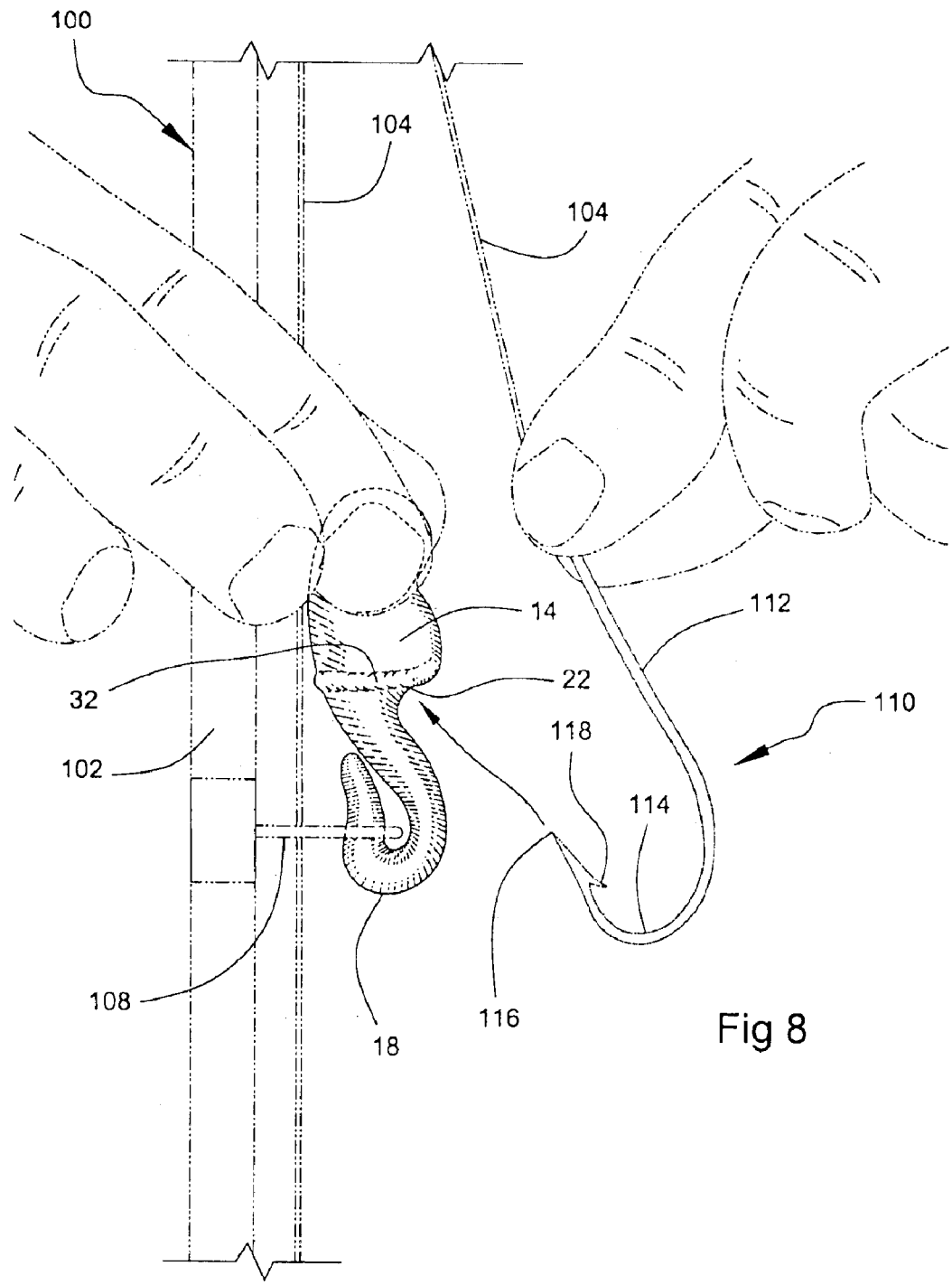
FIG. 8 is a representation of a fishing hook being introduced within the instant invention.

Referring now to the drawings, where the present invention is generally referred to with numeral 10, it can be observed that it basically includes protuberances 14, aperture 22, tail 18, and tip 20. Instant invention 10 is used to guard a fishing hook as described below.

As seen in FIGS. 1 through 7, instant invention 10 comprises head 12 at a top end and tail 18 at a bottom end that hooks and terminates at tip 20. At a predetermined distance below head 12 are masses of matter of irregular shape defining protuberances 14. Generally extending from protuberances 14 is shank 16 that extends to define tail 18. Tail 18 at the bottom end of instant invention 10 hooks and terminates at tip 20. Centrally disposed and above shank 16 is aperture 22.

As better seen in FIG. 2, protuberances 14 bulge to define generally horizontal ridge 32.

As best seen in FIG. 7, aperture 22 extends to wall 28 to define cavity 24. The inside depth of cavity 24 from aperture 22 to wall 28, is sufficient to accommodate the intrusive end of the fishing hook 110, seen in FIGS. 8 and 9, so that bend 114 rests upon edge 26 when fishing line 104 has tension. It is contemplated that cavity 24 can be constructed with a relatively large effective inside depth and diameter to accommodate a broad range of hook sizes. Cavity 24 can accommodate hooks that are commonly used in freshwater and salt water fishing.

Figure 9:
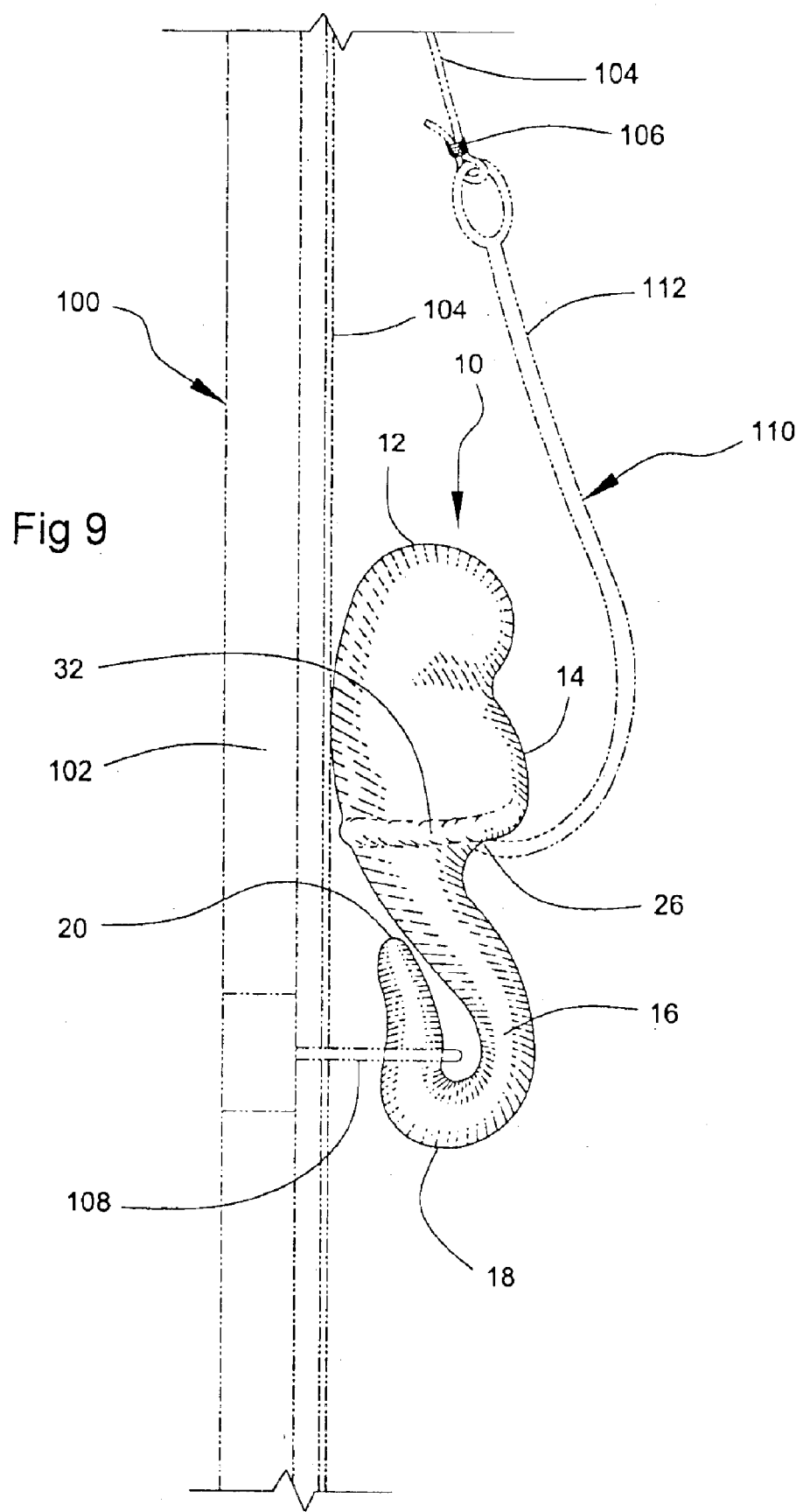
FIG. 9 is a representation of a fishing hook safely secured within the instant invention.

Now referring to FIGS. 8 and 9, fishing rod assembly 100 comprises elongated fishing rod 102. Fishing rod 102 has fishing line 104 originating from a reel, not seen, and extends through a plurality of graduated guides 108, of which only one is seen. Fishing line 104 typically terminates as knot 106 tying fishing hook 110.

Fishing hook 110 comprises shank 112 having bend 114 that terminates at point 116. Typically extended in an angular direction opposite point 116 is barb 118.

In the preferred method of installation wherein fishing line 104 has tension, instant invention 10 first hooks upon one of graduated guides 108, as seen in FIG. 8, wherein tail 18 hooks graduated guide 108. To install the intrusive end, specifically point 116 and barb 118 of the fishing hook 110 into instant invention 10, point 116 of fishing hook 110 is aligned with aperture 22. It is observed that fishing line 104 has tension originating from the reel. Next, while securely holding fishing hook preferably along shank 112, point 116 and barb 118 are inserted into aperture 22 until bend 114 rests upon edge 26 while the user grasps head 12, as seen in FIG. 8.

In a first alternate method of installation wherein fishing line 104 has tension, point 116 of fishing hook 110 is first aligned with and inserted into aperture 22 until bend 114 rests upon edge 26. With tension from the reel upon fishing line 104, the user grasps head 12, or for greater leverage and aiding the user in gripping instant invention 10, biases his/her fingers against ridge 32, and hooks instant invention 10 upon one of graduated guides 108, wherein tail 18 hooks graduated guide 108.

In a second alternate method of installation wherein fishing line 104 does not initially have tension, tip 20, with fishing hook 110 therein, is positioned below a graduated guide 108. Then the tip 20 is inserted upwardly through a graduated guide 108 on the fishing rod 102, until the graduated guide 108 inhibits any further upward movement. Next, the fishing line 104 attached to fishing hook 110 is tightened or reeled in until taut and locked against further extension, thus securing instant invention 10, fishing hook 110, and fishing line 104 to the graduated guide 108. When fishing line 104 becomes taut, a generally upward and outward force is applied to the fishing hook 110. This force tends to help keep tail 18 engaged with the graduated guide 108.

It is noted that tail 18 of instant invention 10 is sufficiently hooked so that tip 20 contacts or nearly contacts the surface of shank 16 opposite the side of where aperture 22 is defined. The near proximity or contact of tip 20 against the surface of shank 16 opposite the side of where aperture 22 is defined, causes instant invention 10 to remain hooked upon the graduated guide 108 until removed by a downwardly force that overcomes that of tip 20 against the surface of shank 16 opposite the side of where aperture 22 is defined.

Once assembled, the intrusive end or barbed portion of fishing hook 110 is essentially encapsulated as shown in FIG. 9. Therefore, the intrusive end of the fishing hook 110 is less likely to hook, stab, or otherwise cause injury by the fishing hook 110 when covered by instant invention 10, and while secured to the fishing line 104 on fishing rod assembly 100 and once the slack is removed from the fishing line 104. Ridge 32 also provides limited protection for the user's thumb and/or fingers should the user miss aperture 22 when attempting to insert the intrusive end of the hook fishing hook 110 into instant invention 10. Because the diameter of aperture 22 is larger than point 116 and barb 118 of fishing hook 110, it may accommodate a variety of fishing hooks.

One skilled in the art will recognize that instant invention 10 covers very little of the fishing hook 110 other than the point 116 and the barb 118. Therefore, it is easily adaptable to various sizes and styles of hooks. One size of instant invention 10 will fit many different sizes of hooks and a variety of different sizes of instant invention 10 can be provided to cover a wide range of hook sizes. Preferably, instant invention 10 is constructed of a lightweight and durable material, such as plastic, wood, and the like. The material should be rigid, yet resilient. Plastic is preferred for its ability to be molded at low cost in a variety of colors.

The instant invention 10 is installed on the fishing hook 110 as previously described. Once installed, the instant invention 10 can be used in a dual capacity to both cover the fishing hook 110 and secure it to the graduated guide 108 of a fishing rod 102. For use of the instant invention 10 in areas with little or no light, it is noted that it can be made of a fluorescent material for safety and facility to use.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A fishing hook guard for covering a fishing hook having a shaft terminating in a point and a barb extending rearwardly and outwardly from said point, comprising a body member having a head at a first end, a tail at a second end, and a shank therebetween, said body member also having at least one protuberance for gripping by the user at a first predetermined distance from said head extending towards said tail, said body member further comprising an aperture for receiving said point and said barb of said fishing hook thereinside, said aperture extending internally towards said head, said tail being bent back along said shank in an opposite direction such that it extends toward said head and forms a U-shaped bend with the shank and said tail terminating in a tip, said tail being removably mountable onto a graduated guide of a fishing rod, said at least one protuberance comprising a generally horizontally and outwardly protruding ridge interposed between said first and second ends, said protruding ridge extends both laterally from the body member and around said body member so as to allow a user to grip said fishing hook guard during insertion of said point and said barb into said aperture.

2. The fishing hook guard set forth in claim 1, further characterized in that said tail is sufficiently-said bent back so that said tip contacts or nearly contacts said shank so as to secure said fishing hook guard onto said graduated guide.

3. The fishing hook guard set forth in claim 2, further characterized in that said fishing hook guard is made of a durable plastic material.

4. The fishing hook guard set forth in claim 3, further characterized in that said fishing hook guard is of a fluorescent material.

* * * * *

UNITED STATES PATENT AND TRADEMARK OFFICE
CERTIFICATE OF CORRECTION

| | | |
|---|---|---|
| PATENT NO. | : 6,883,266 B1 | |
| APPLICATION NO. | : 10/768208 | |
| DATED | : April 26, 2005 | |
| INVENTOR(S) | : Alejandro Valdivia, Sr. | |

It is certified that error appears in the above-identified patent and that said Letters Patent is hereby corrected as shown below:

Title Page; item (76); should read;

Inventor's Address:

14820 SW 151 Ter., Miami, FL 33196

Signed and Sealed this
Thirtieth Day of August, 2011

David J. Kappos
*Director of the United States Patent and Trademark Office*